(No Model.)  2 Sheets—Sheet 1.
W. O. COLEMAN.
SEED COTTON SEPARATOR AND CLEANER.
No. 278,401.  Patented May 29, 1883.
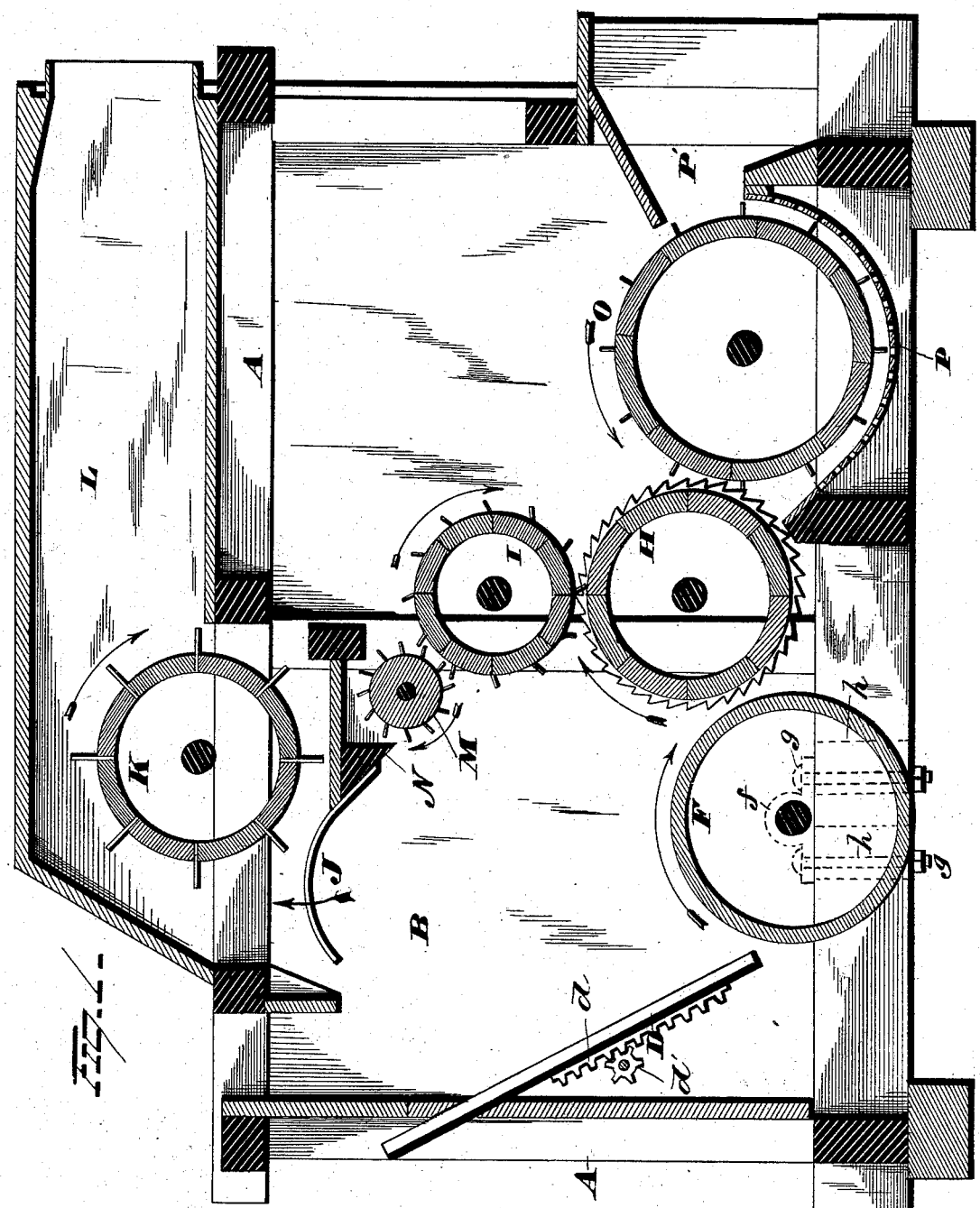

(No Model.) 2 Sheets—Sheet 2.
W. O. COLEMAN.
SEED COTTON SEPARATOR AND CLEANER.
No. 278,401. Patented May 29, 1883.
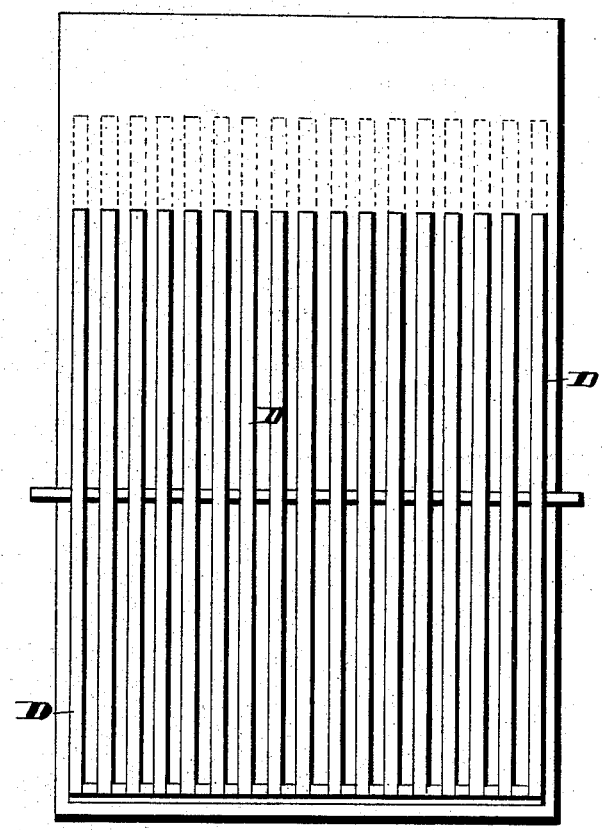
WITNESSES
E. Nottingham
Geo. F. Downing
INVENTOR
Wm O. Coleman
B. A. Sugmon,
Attorney

UNITED STATES PATENT OFFICE.

WILLIAM O. COLEMAN, OF MEMPHIS, TENNESSEE.

SEED-COTTON SEPARATOR AND CLEANER.

SPECIFICATION forming part of Letters Patent No. 278,401, dated May 29, 1883.

Application filed September 9, 1882. (No model.)

*To all whom it may concern:*

Be it known that I, W. O. COLEMAN, of Memphis, in the county of Shelby and State of Tennessee, have invented certain new and useful Improvements in Seed-Cotton Separator and Cleaner; and I do hereby declare the following to be a full, clear, and exact description of the invention, such as will enable others skilled in the art to which it pertains to make and use the same.

My invention relates to an improvement in seed-cotton separators, the object of the same being to clean and separate seed-cotton that has been roughly gathered, and which is intimately mixed with bolls, hulls, sand, dust, leaves, and other impurities; and with these ends in view my invention consists in the parts and combinations of parts, as will be more fully described, and pointed out in the claims.

In the accompanying drawings, Figure 1 represents a longitudinal vertical sectional view of my improved separator. Fig. 2 is a plan view of the grate.

A represents the frame of the machine; B, the hopper thereof, into which the seed-cotton to be cleaned and separated is thrown by hand or fed by any suitable machinery adapted for the purpose.

D is one of a series of grate-bars, the upper ends of which are secured to the front end of the machine. These grate-bars D are made of iron or wood, and are about one-fourth of an inch in diameter, and are placed about three-fourths of an inch apart from center to center, and are adjustably secured to the front end of the machine, so that the lower ends thereof can be adjusted nearer to or farther away from the feed-cylinder F, as circumstances demand, by means of a rack, $d$, secured to the under side of the bar, and a toothed pinion, $d'$. This series of grate-bars D is placed in an inclined position, and the lower ends of the bars composing the series are secured together by a suitable brace or connecting-bar, which prevents the said grate-bars from spreading. The feed-cylinder F is situated in close proximity to the lower ends of the grate-bars, and as the cotton, with its intimately-mixed bolls and trash, falls onto the grate-bars from the hopper, it is directed by the inclination of the said grate-bars onto the feed-cylinder. As the seed-cotton falls from the hopper onto the grating a portion of the loose seed, bolls, and trash becomes separated from the seed-cotton and falls between the grating, while the balance thereof continues down to the feed-cylinder F, over which it is carried to the separating-cylinder H. The separating-cylinder can be made by using a series of circular saws with teeth made similar to what are known as "gin-saws," and made hooking, so that they will take hold of the cotton as it is thrown against it by the feed-cylinder, the saws being placed about three-fourths of an inch apart, or about the same distance apart as the saws in a cotton-gin; or the separating-cylinder can be made by driving sharp-pointed round nails or spikes in a smooth wooden cylinder, with the sharp points cut and all bent upward to form hooked teeth, similar to those on a gin-saw, with the exception that the teeth would be placed about one-half of an inch apart on the circumference of the cylinder and in circumferential rows, so as to form series of teeth, the same as the ordinary circular saws. This separating-cylinder is situated in a horizontal plane slightly higher than the feed-cylinder, and, as before stated, is provided with a series of circular saws or teeth, which take the cotton up from the feeding-cylinder as the latter revolves. The feeding-cylinder is journaled in movable boxes, which enables it to be adjusted nearer to or farther away from the separating-cylinder, so as to leave an opening or space between the two cylinders, through which all loose dirt and trash will fall before reaching the separating-cylinder. A similar space on the opposite side of the said cylinder, and between it and the grate-bars, is also left for the same purpose. The separating-cylinder revolves in the direction of the arrow and carries the cotton, with the contained seed and trash, up to the hulling-cylinder I, which latter is situated over the said toothed or saw cylinder.

The hulling-cylinder I, before referred to, is geared or belted so as to revolve in the direction indicated by the arrows about five times as fast as the said separating-cylinder. This hulling-cylinder is provided with spikes or wire nails arranged lengthwise of the cylinder, and adapted to pass between the teeth or saws of the separating-cylinder as the hulling-cylinder revolves. These nails or spikes are either driven into the wood cylinder in the inclination shown, or are driven in straight and bent backward after they are secured in place. When the cotton with its contained impurities is taken up by the saws or teeth of the separating-cylinder, the intimately-mixed mass is carried upward until it comes in contact with the pins or teeth of the hulling-cylinder, which, revolving rapidly, knocks back all the twigs, bolls, or similar trash which are exposed to the action of the said huller, and also any cotton which adheres to the said bolls, twigs, &c. The cotton which adheres to the twigs, &c., which are removed from the separating-cylinder by the hulling-cylinder, is thrown with considerable force back onto the grating, which loosens the mass and allows the contained dirt or sand to fall from the cotton and pass through the grate-bars, or be carried upward by the suction from the fan K through the grate-bars J, which latter are made of the same material and separated by about the same intervals as the bars composing the series D, into the dust-flue L, and out of the machine. If, from any cause whatever, any bolls, twigs, cotton, &c., should adhere to the teeth of the hulling-cylinder instead of being knocked by them onto the grate-bars D, they are carried in the direction of rotation of the said hulling-cylinder until the clearing-cylinder M is met, which latter is situated above and to one side of the hulling-cylinder. This clearing-cylinder is provided with spikes or teeth similar to the hulling-cylinder, and revolves in the same direction therewith, the circumferential rows of teeth of the said cylinder running between the rows of teeth of the hulling-cylinder. If, as before stated, bolls, twigs, or other similar substances should adhere to the teeth of the hulling-cylinder, they are either knocked off by the teeth of the clearing-cylinder or taken up thereon until the edge of the beveled brace N is reached, which clears the teeth of the clearing-cylinder. As the seed-cotton, twigs, and bolls are knocked off by the hulling and clearing cylinders, the heavier particles fall onto the grating and pass out of the machine, while the dust and lighter particles are carried upward and out through the dust-flue. The cotton which is knocked back with the bolls, twigs, &c., by the hulling and clearing cylinders falls back onto the inclined grating, mingles with the cotton thereon, and passes through the same process until all the cotton has been freed from adhering trash. During these different movements of the cotton it is torn apart and loosened, which frees all the dirt and allows it to fall onto the grating or be drawn upward by the air-blast, as before described. The cotton that adheres to the teeth of the separating-cylinder during its operation and passes beyond the hulling-cylinder is carried by the said saw or toothed cylinder around to the stripping-cylinder O, which latter runs faster than the said separating-cylinder. This stripping-cylinder is made of wood, and is provided with teeth or spikes adapted to move or work between the teeth of the separating-cylinder and remove the cleaned cotton therefrom as it is brought around by the separating-cylinder.

P is a wire screen or netting situated immediately under the stripping-cylinder, and forms a chute or platform over which the cotton passes when it is taken up by the stripping-cylinder. The stripping-cylinder revolves in an opposite direction from that of the separating-cylinder, and consequently carries the cotton over the wire screen and allows any remaining dust or sand to fall through the same and pass out of the machine. The cotton is carried upward by this stripping-cylinder until the delivery-spout P' is reached, into which the cleaned and separated seed-cotton passes, and is discharged therefrom and falls in a loose pile on the floor, or into any receptacle prepared to receive it; or the machine can be set on a floor above the gin, and by suitable guides, chutes, or conveyers deliver the seed-cotton immediately to the gin; or it can be set below the gin, and by means of an elevator deliver up and discharge the cotton into it.

The small clearing-roller is merely intended to keep any cotton or hulls from making a complete revolution on the hulling-cylinder, and the beveled piece or brace N is intended to prevent the same from taking place on the clearing-cylinder.

My invention is simple in construction, is durable in use, and effectually clears the cotton of all impurities before ginning.

It is evident that slight changes and alterations in the construction and relative arrangement of the different parts might be resorted to without departing from the spirit of my invention, and hence I would have it understood that I do not limit myself to the exact construction shown and described, but consider myself at liberty to make such changes and alterations as come within the spirit and scope of my invention.

Having fully described my invention, what I claim as new, and desire to secure by Letters Patent, is—

1. In a machine for cleaning seed-cotton, the combination, with the receiving-hopper, of a series of inclined grate-bars provided with means for vertically adjusting them, a horizontally-adjustable feeding-cylinder, and a separating-cylinder, substantially as set forth.

2. In a machine for cleaning seed-cotton, the combination, with the feeding and separating cylinders, the former being adjustable relatively to the latter, of a hulling-cylinder provided with inclined spikes adapted to work between the teeth of the separating-cylinder, substantially as set forth.

3. In a machine for cleaning seed-cotton, the combination, with the feeding, separating, and hulling cylinders and the clearing-roll, of the beveled brace situated in front of the clearing-cylinder, substantially as set forth.

4. In a machine for cleaning seed-cotton, the combination, with the inclined adjustable grate-bars and the grating located at the inner end of the dust-flue, of the feeding, separating, and hulling cylinders and the clearing-roller and beveled brace located adjacent to the latter, substantially as set forth.

5. In a machine for cleaning seed-cotton, the combination, with the hopper, inclined grating, feeding, separating, and hulling cylinders, the clearing-roll, beveled brace, the grating situated at the inner end of the dust-flue, the dust-flue, and fan, of the stripping-cylinder and the wire screen situated below the same, substantially as set forth.

In testimony whereof I have signed this specification in the presence of two subscribing witnesses.

WILLIAM ORSBERN COLEMAN.

Witnesses:
JNO. L. COOPER,
J. W. FALLS.